United States Patent
Backlund et al.

(10) Patent No.: US 9,599,271 B1
(45) Date of Patent: Mar. 21, 2017

(54) INTERNAL PIPE CUTTING SYSTEM AND METHOD THEREOF

(71) Applicant: Torqbuddy L.L.C., Woodbury, MN (US)

(72) Inventors: Jeffrey Karl Backlund, Woodbury, MN (US); Kevin Alan Cyrus, Nowthen, MN (US)

(73) Assignee: Torqbuddy LLC, Woodbury, MN (US)

( * ) Notice: Subject to any disclaimer, the term of this patent is extended or adjusted under 35 U.S.C. 154(b) by 168 days.

(21) Appl. No.: 14/099,081

(22) Filed: Dec. 6, 2013

Related U.S. Application Data (60) Provisional application No. 61/734,169, filed on Dec. 6, 2012.

(51) Int. Cl.
*F16L 55/18* (2006.01)
*F16L 55/162* (2006.01)

(52) U.S. Cl.
CPC ............ *F16L 55/162* (2013.01); *F16L 55/18* (2013.01)

(58) Field of Classification Search
USPC .................................. 138/97; 405/149, 156
See application file for complete search history.

(56) References Cited

U.S. PATENT DOCUMENTS

| | | | | |
|---|---|---|---|---|
| 2,695,449 A | * | 11/1954 | Chauvin | B23D 21/145 30/107 |
| 3,087,546 A | * | 4/1963 | Woolley | E21B 29/00 166/277 |
| 3,216,295 A | | 11/1965 | Gill | |
| 3,939,561 A | * | 2/1976 | Nichols | B23D 21/08 30/107 |
| 4,177,559 A | | 12/1979 | Anderson | |
| 4,307,512 A | * | 12/1981 | Phillips | B23D 45/126 30/102 |
| 4,703,802 A | * | 11/1987 | Bryan | E21B 29/005 166/298 |
| 5,511,573 A | * | 4/1996 | Corte | F16K 27/12 137/15.08 |
| 5,685,078 A | | 11/1997 | Obst et al. | |
| 5,815,926 A | | 10/1998 | Ekern | |
| 5,884,668 A | * | 3/1999 | Larkin | F16L 55/132 138/89 |
| 5,924,489 A | * | 7/1999 | Hatcher | E21B 17/1007 166/298 |
| 2014/0157963 A1 | * | 6/2014 | Von Wirth | E02D 9/04 83/27 |

* cited by examiner

*Primary Examiner* — James Hook
(74) *Attorney, Agent, or Firm* — Mitchell|Hamline IP Clinic (57) ABSTRACT

An internal pipe cutting system is disclosed. The internal pipe cutting system includes an internal pipe cutter which includes a motor, an upper shaft, and a cutting blade. The internal pipe cutting system further includes a hollow cylindrical support basket which includes an adjustable ring removably mounted to the exterior surface of the support basket. Further, the internal pipe cutting system includes a bearing assembly configured to be coupled between the internal pipe cutter and the support basket.

13 Claims, 13 Drawing Sheets

INTERNAL PIPE CUTTING SYSTEM AND METHOD THEREOF

CROSS REFERENCE TO RELATED APPLICATIONS

This application claims priority to U.S. Provisional Patent Application Ser. No. 61/734,169, filed on Dec. 6, 2012, entitled IMPROVED PROCESS OF REPAIRING WATER VALVE BOX UTILIZING INTERNAL PIPE CUTTER, the content of which is hereby incorporated by reference herein in its entirety.

FIELD OF THE DISCLOSURE

The present disclosure generally relates to the maintenance and repair of underground pipes used to transport liquids or gas, and/or pipes used to control such transportation. One example embodiment of the present disclosure relates to an improved tool and process for repairing city water valve boxes that have been damaged.

BACKGROUND

City water valve boxes are often located on city streets. This location is advantageous to the city as the water valve boxes are easy to access and minimally impede residents of the area when maintenance or repair is required. However, in cooler climates that experience frequent frost, the location of the valve boxes becomes problematic. The valve box's hub is located beneath the frost layer that occurs in these colder climates, which results in the valve box staying relatively un-shifted by frost heave. However, the city street that the valve box is located on is much more prone to shifts due to the frost heave. As such, at certain times, the upper valve box may become exposed above the surface of the street. The climates that experience such frost heaves are also prone to snow falls, which require snowplows to clear the streets to allow for safe travel. When a snowplow hits an exposed valve box, there is the potential that the upper valve box may fracture rendering the valve inoperable, at which point the valve box must be repaired.

Conventional repair of city water valve boxes has generally been achieved in one way; digging up the surrounding area, removing and replacing the entire damaged valve box and filling in the hole. However, in practice, this often is labor intensive and can result in lengthy road closures.

Similarly, other underground pipes including, but not limited to, water, sewer and gas pipes experience similar frost heave in cooler climates. Though not exposed at the surface to damage, as are city water valve boxes, rocks in proximity to the underground pipe, shifting due to the heave, can damage and sever such pipes. Conventional repair of such pipe breaks involves: digging up the surrounding area, removing and replacing the damaged pipe section, and back-filling the hole. Such pipe breaks can result in significant utility service outages to residents.

SUMMARY

In accordance with the following disclosure, the above and other issues are addressed by the following.

In a first aspect, the present disclosure provides a system for internal pipe cutting, surfacing, and altering. The system includes an internal pipe cutter, a support basket and a bearing assembly. The internal pipe cutter includes a motor, a shaft and a cutting blade. The support basket includes an adjustable ring secured to the exterior surface of the support basket and the bearing is configured to couple the support basket and internal pipe cutter together.

In a second aspect, the present disclosure provides for an internal pipe cutter. The internal pipe cutter includes a motor, a motor mount, a cutting blade, an upper drive shaft connected to the motor and cutting blade, and an upper shaft housing encasing the upper shaft from the motor mount to the cutting blade.

In a third aspect, the present disclosure provides for an internal pipe cutter support basket. The pipe cutter support basket includes an interior surface and an exterior surface, an adjustable ring removably mounted to the exterior surface, and an internal stability element mounted to the interior surface, wherein the central axis of the internal stability element coaxially aligns with the central axis of the support basket.

The above summary of the various aspects and embodiments is not intended to describe each embodiment or every implementation of the improved method for repairing a damaged water valve box. Rather, the embodiments are chosen and described so that others skilled in the art may appreciate and understand the principles and practices of the improved method for repairing an underground pipe.

BRIEF DESCRIPTION OF THE DRAWINGS

The above and other objects, features and other advantages according to several embodiments of the present disclosure will be more clearly understood from the following detailed description taken in conjunction with the accompanying drawings, in which.

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 10:
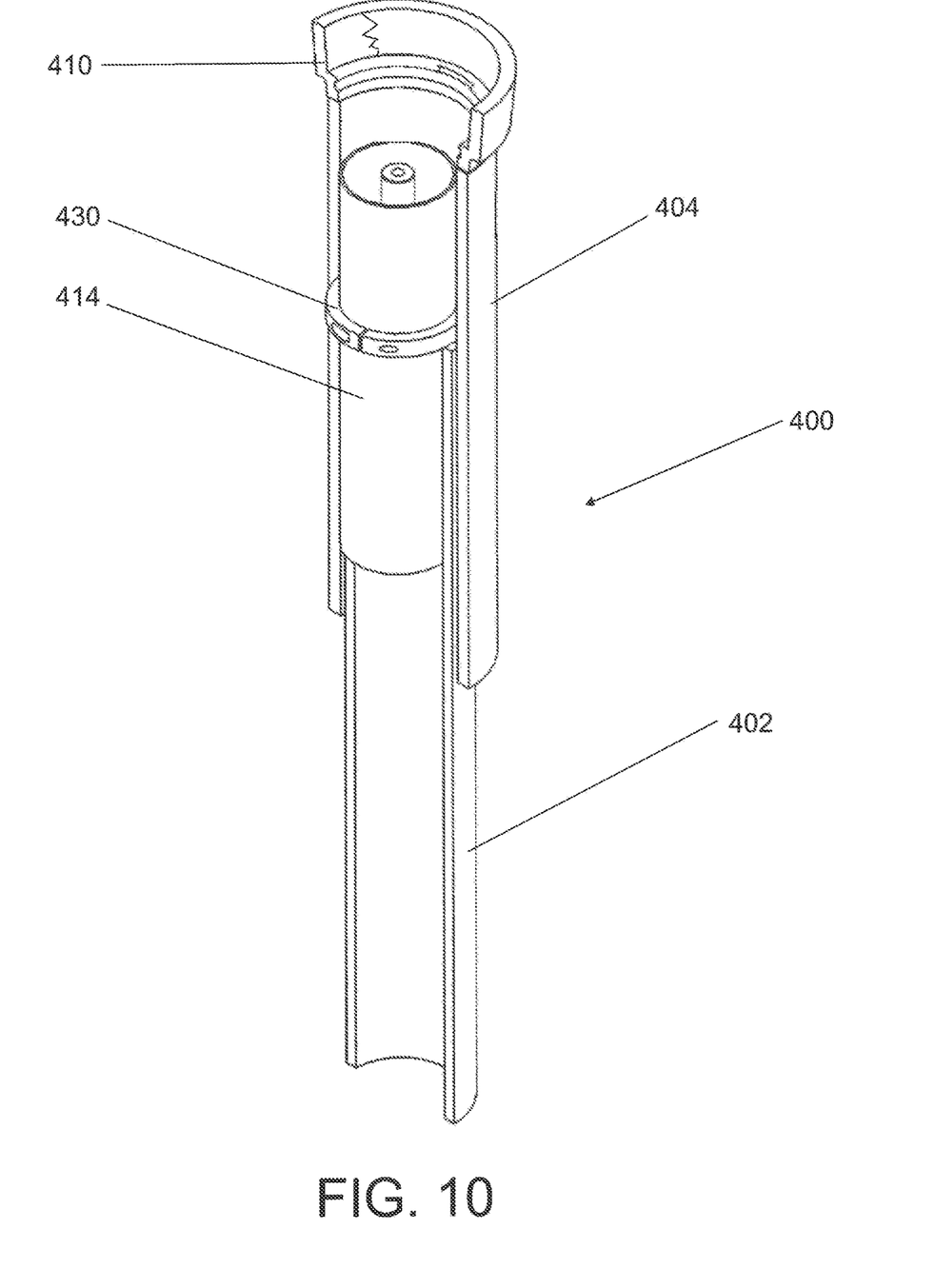
FIG. 10 is an isometric partial cross-sectional view of a valve box assembly including a support basket, according to one embodiment of the present disclosure, seated therein.

The present disclosure, in some embodiments, relates to a tool and method for repairing the upper portion of water valve boxes. The upper portion of a water valve box may be exposed at the surface of a roadway and may be cracked, chipped, or otherwise damaged by a plow, for example. In many valve boxes, as shown in FIG. 10, a riser portion may extend upward from the valve box and may stop short of the roadway. A larger diameter section with a bell may be arranged on the riser section and may threadably engage the riser section allowing the larger diameter section with the bell to be threadably adjusted in height to match the roadway elevation. However, after it is damaged or cracked, it may need to be repaired. The present disclosure includes a tool that may be used to cut an upper portion of the larger diameter section including the bell free from the larger diameter section. The tool may allow this to be performed from the inside of the pipe allowing it to be replaced with a new section. This approach allows the upper valve box to be replaced without tearing up the surrounding pavement and replacing it.

Hereinafter, embodiments of the present disclosure will be described in detail with reference to the accompanying drawings.

Figure 1:
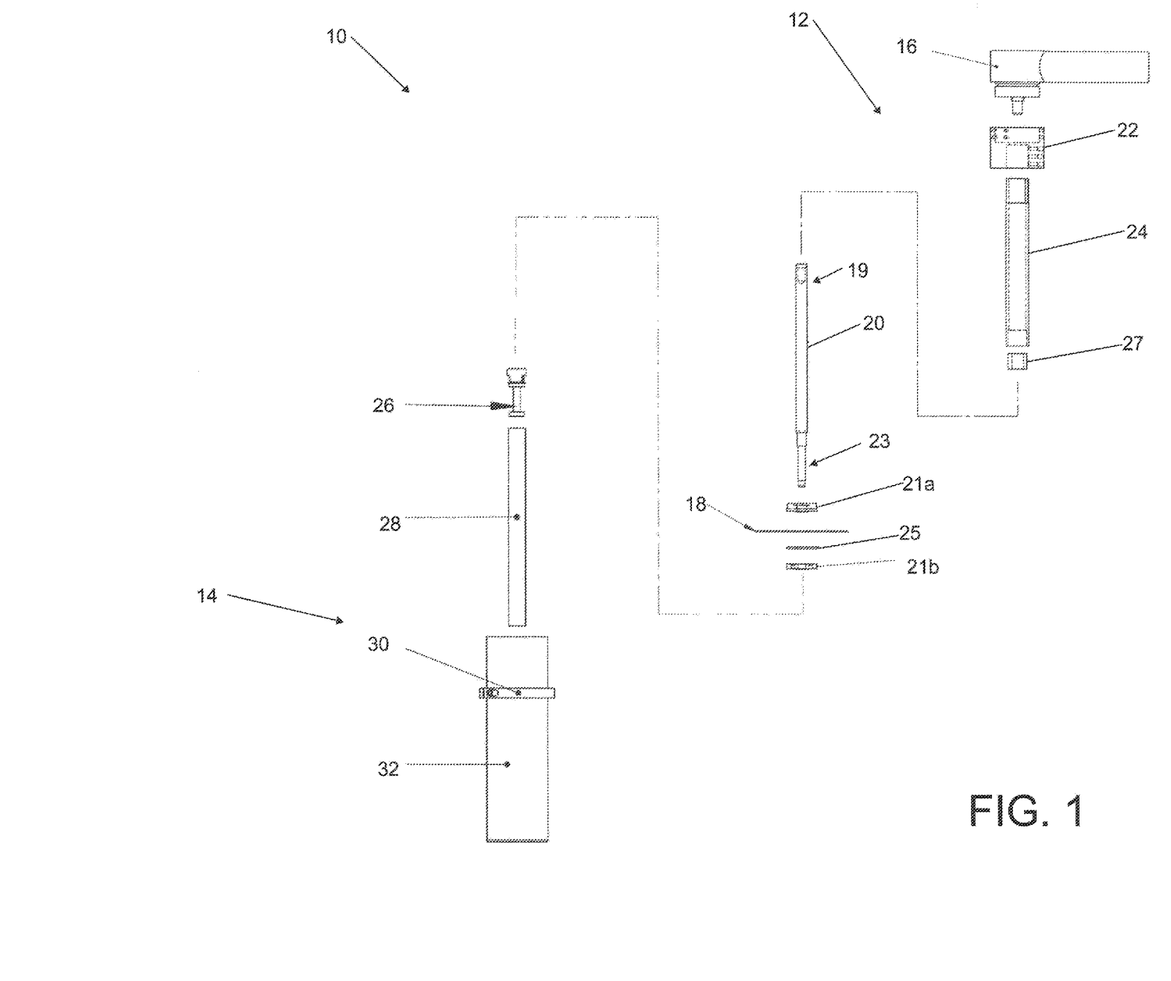
FIG. 1 is an exploded side view of the internal pipe cutter system according to one embodiment of the present disclosure.

FIG. 1 shows an exploded side view of the internal pipe cutter system 10 including an internal pipe cutter assembly 12 and support basket assembly 14, according to one embodiment of the present disclosure. The support basket assembly 14 may be configured for placement in the valve box to define the depth and location of the cut and control the cutting of the valve box. The support basket 14 may include an adjustable ring 30, a support cylinder 28, and a lower bearing assembly 26. The internal pipe cutter assembly 12 may be configured for insertion into the support basket assembly 14 to cut the valve box and allow for replacement of the top portion thereof. The internal pipe cutter assembly 12 may include a motor 16, an upper shaft 20, a cutting blade 18, a motor mount 22, and upper shaft housing 24.

The internal pipe cutter 12 includes a motor 16. The motor 16 may be an electric motor, an internal combustion motor, a pneumatic motor or a like power source. In some embodiments, the motor 16 from a hand tool (i.e. an angle grinder or power drill) may be used. The motor 16 may be a 15 amp, 120-volt motor capable of a no load maximum RPM range of about 5,000 to about 8,500. Further, the motor 16 may have a maximum horsepower of about three. In other embodiments the motor 16 may be a 110-volt motor. Additionally, the motor may be powered by a wireless source like a battery. It is appreciated that a variety of different motors may be utilized in the internal pipe cutter 12 pipe to accomplish the cutting of the valve box, therefore, a variety of different motors considered within the scope of the present disclosure.

The internal pipe cutter 12 also includes an elongated upper shaft 20. In one embodiment, the upper shaft 20 may have a circular perpendicular cross-section. However, it is appreciated that a variety of different perpendicular cross-sectional shapes may be utilized and a variety of polygonal cross-sectional shapes are considered within the scope of the present disclosure. The upper shaft 20 may be sized to a length of about 12 inches. In other embodiments, a length ranging from approximately 2 inches to approximately 36 inches or from 6 inches to approximately 18 inches may be used. In still other embodiments, the upper shaft 20 may be telescoping, so that the user may readily alter the length of the shaft 20. The upper shaft 20 may include a proximal end 19 and a distal end 23. The proximal end 19 may include a bore. The bore can be sized and shaped to mate with the motor 16. In some embodiments, the perpendicular cross-section of the bore may be circular or polygonal or another cross-section may be used. Alternatively, the proximal end 19 may include a coupling, such as a jaw connection, used to secure the upper shaft 20 to the motor 16. A set screw, or like locking device, may be used to assist the securing of the upper shaft 20 to the motor 16. Further, in some embodiments, the distal end of the upper shaft 23 may be stepped, thereby consisting of a variety of sections with unique diameters. The cross-section of the distal end of the upper shaft 23 may be sized to accept locking mechanisms 21a, 21b and a cutting blade 18. In some embodiments, the distal end of the upper shaft 23 may be partially threaded to accept threaded locking nuts. The distal end of the upper shaft 23 may also be sized to accept a plastic spacer 25 placed between the locking mechanism and the cutting blade to ensure proper spacing and friction between the cutting blade 18 and the locking mechanism 21a, 21b.

The internal pipe cutter 12 also includes a cutting blade 18 secured to the distal end of the upper shaft 23. In one embodiment, the cutting blade 18 may be substantially circular. A variety of differently sized cutting blades may be utilized with the internal pipe cutter 12 depending on the diameter of the pipe that is to be cut. In some embodiments, a cutting blade having a diameter between about 5 inches and about 6 inches may be used. The cutting blade 18 may be manufactured from a variety of materials. In some embodiments, the cutting blade 18 may be metal and may include a plurality of teeth. In some embodiments, the cutting blade 18 can include aluminum oxide to facilitate cutting. In other embodiments, the cutting blade 18 may be constructed from ceramic or hard abrasives. In still other embodiments, the cutting blade 18 may be reinforced by fiberglass. In other embodiments, the cutting blade 18 may be coated with diamond particles. The cutting blade 18 can also be a concrete cutting wheel.

The internal pipe cutter assembly 12 may include a motor mount 22 and an upper shaft housing 24. The motor mount 22 may be configured to readily connect a motor to the upper shaft 20. The proximal end of the motor mount 22 can be coupled to the motor 16, and the distal end of the motor mount 22 can be coupled to the proximal end of the upper shaft housing 24. The upper shaft housing 24 can be configured to encase the upper shaft 20 from the motor mount 22 to the cutting blade 18. The upper shaft housing 24 can include a bearing 27 rotatably connected therein to ensure free rotation of the upper shaft 20 within the upper shaft housing 24. The combination of the motor mount 22 and upper shaft housing 24 can protect the user from entanglement with the exposed upper shaft 20 as it rotates. Both the upper shaft housing 24 and the motor mount 22 may be used as handgrips or be configured to accept bolt-on hand-grip accessories.

In addition to the internal pipe cutter 12, the internal pipe cutting system 10 also can include a support basket assembly 14 to define the depth and location of the cut by the internal pipe cutter and control the cutting of the valve box. The support basket assembly 14 comprises a removable adjustable clamp ring 30, a support cylinder 28, and a lower bearing assembly 26.

The support basket assembly 14 comprises a removable adjustable clamp ring 30 which can be adjusted to clamp to a plurality of different locations on the exterior of the support basket 32. According to one embodiment, the adjustable clamp ring 30 can be secured to the exterior of the support basket 32 using fasteners, for example, bolts. In another embodiment, the adjustable clamp ring 30 can be secured to the exterior of the support basket 32 utilizing a friction fit. Other embodiments of the adjustable clamp ring 30 can include an elastic ring, or utilize any assortment of quick-release, clevis, locking pins, spring plungers, a combination of the above, or the like, to accomplish the same result of vertically coupling the adjustable clamp ring 30 to the exterior of the support basket 32. The outside diameter of the adjustable ring 30 can be varied accordingly to fit within differently sized valve boxes.

In some embodiments, the support basket assembly 14 may also include a stability element which provides a surface for a portion of an internal pipe cutter to rest (e.g. a rotating upper shaft 20). In the depicted embodiment, the stability element is a support cylinder 28. The support cylinder 28 can be sized to a length that is about the length of the support cylinder 14. In addition, the support cylinder 28 should have a diameter that is larger than the diameter of the upper shaft 20 of the internal pipe cutter 12. In some embodiments, the support cylinder 28 is centered within the support basket 14 and attached to an internal plate within the support basket 14. Also, in some embodiments, the support cylinder 28 may be attached to the support basket and may include a centering mechanism (see FIG. 2).

The support basket assembly 14 can include a lower bearing assembly 26. The lower bearing assembly 26 can include a single bearing or a plurality of bearings. In the depicted embodiment, the lower bearing assembly 26 can be press fit into the support cylinder 28. The inner race of the bearing assembly 26 can be sized to be removably coupled to a rotating upper shaft of an internal pipe cutter. In addition, the lower bearing assembly may include an upper flange. The flange of lower bearing assembly 26 may be configured to rest upon the upper lip of the support cylinder 28.

Alternatively, the lower bearing assembly may be secured to the upper shaft 20 of the internal pipe cutter 12. In one embodiment, the lower bearing assembly 26 can be secured to the upper shaft 20 by way of a set screw. In other embodiments, the lower bearing assembly 26 may threaded upon the upper shaft 20. In even other embodiments, the lower bearing assembly 26 may be secured to a lock nut, or a like securing device, on the distal side of the cutting blade 18.

In other embodiments still, the lower bearing assembly 26 can be secured to the upper shaft 20 and press fit within the support cylinder 28. In such an embodiment, the support cylinder 28 is unattached from the support basket 14 and therefore acts as part of the internal pipe cutter 12. In such an embodiment, the support cylinder 28 can be adapted to limit the depth at which a cut is performed by the cutting blade 18. The depth at which the cut is performed is limited by the displacement caused by the support cylinder 28 resting upon a surface (e.g. a surface secured within the support basket) to effectively offset the cutting blade 18 a predetermined distance from the resting surface. The offset distance is therefore dependent upon the length of the support cylinder 28. Accordingly, the support cylinder 28 can be sized to various lengths. In one embodiment, the support cylinder 28 may be telescoping so that the depth of the cut can be quickly adjusted. Further, the lower bearing assembly 26 and the support cylinder 28 can be adapted to function as a cutting guide for the cutting blade 18 as the support cylinder 28 rotates around the inner diameter of the support basket assembly 14.

Also, in other embodiments, the lower bearing assembly 26 may be secured to both the support cylinder 28, and thereby the support basket 14, and the upper shaft 20 of the internal pipe cutter 12. In such an embodiment, the lower bearing assembly connection allows an internal pipe cutting system 10 to be transported as a single tool. In other embodiments the lower bearing assembly 26 may be free-floating between the internal pipe cutter 12 and the support basket 14.

Figure 2:
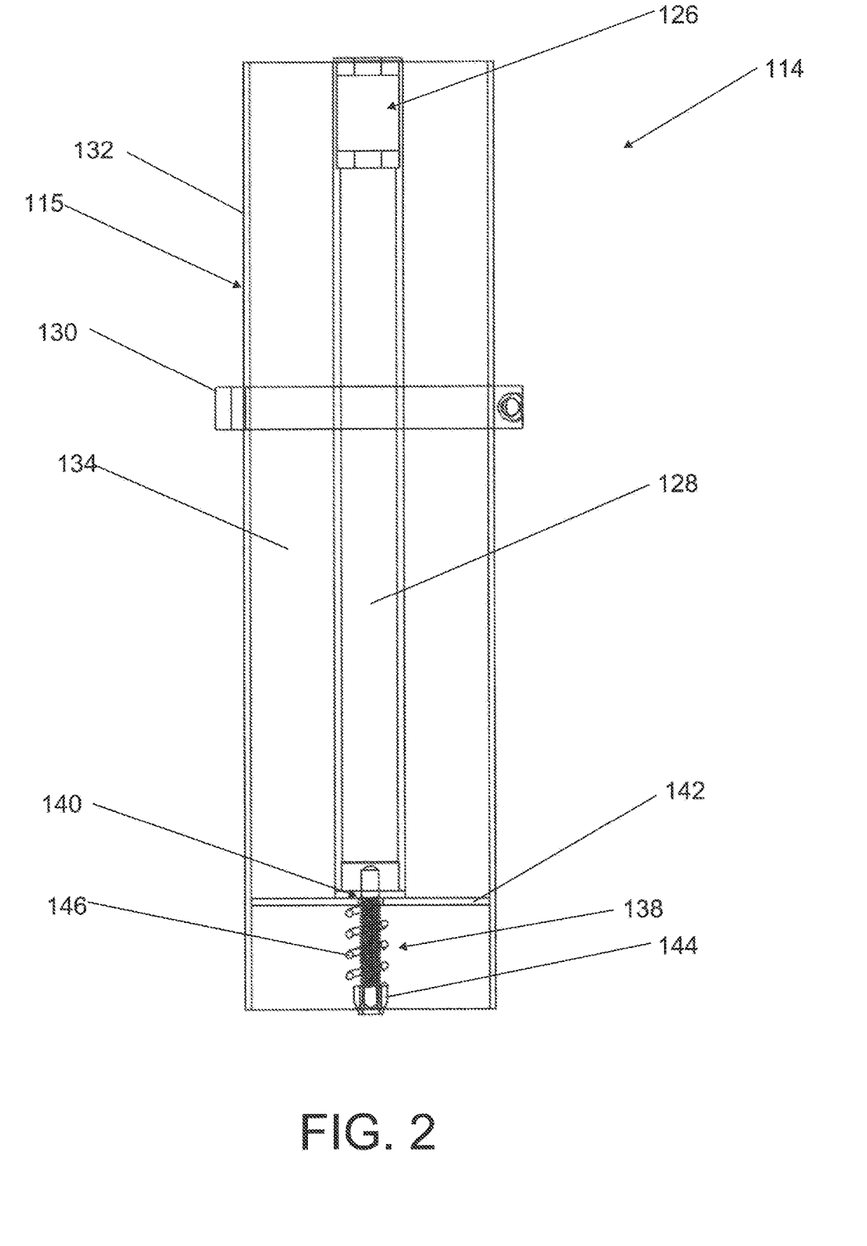
FIG. 2 is a cross-sectional side view of a support basket assembly according to one embodiment of the present disclosure.

FIG. 2 shows a cross-sectional view of a support basket 114, according to one embodiment. The support basket 114 may include an adjustable ring 130, support cylinder 128, lower bearing assembly 126 and a centering device 138. In one embodiment, the support basket 114 is substantially hollow, having an exterior surface 132 and an interior surface 134. The support basket assembly 114 can include an adjustable ring 130 attached to the exterior surface of the support basket assembly 132. The support basket body 115 can be constructed from a variety of materials. In some embodiments, the support basket body 115 may be manufactured from plastic. In addition, the support basket 114 should be sized accordingly to fit within a water valve box.

In some embodiments, the support cylinder 128 may be secured to the interior of the support basket 134 at a securing point 140 by way of an internal plate 142 and a bolt 144. The bolt 144 may pass through the plate 142 and be threaded into the support cylinder 128 to provide stability to the support cylinder 128. In some embodiments, the securing bolt 144 may pass through a centering spring 146. The centering spring 146 allows the support cylinder 128 to pivot about the securing point 140 when external forces are applied to the support cylinder 128. Absent forces being applied to the support cylinder 128, the spring 146 will center the support cylinder 128 and effectively coaxially align the central axis of the support cylinder 128 with the central axis of the support basket 114. In other embodiments, the support cylinder 128 may be secured to the inside of the support basket by a plurality of springs, which act together to center the support cylinder 128 within the support basket 114. Additionally, in the depicted embodiment, the support basket assembly 114 can also include a lower bearing assembly 126 press fit within the support cylinder 128.

In other embodiments, the support basket's support element can be a plate secured to the inside of the support basket. Further, the plate may include a central indention to interact with the internal pipe cutter to keep the internal pipe cutter generally centered inside the valve box. In one embodiment, the plate can support the distal end of a support cylinder, which is attached to the upper shaft by way of a lower bearing assembly.

Figure 3:
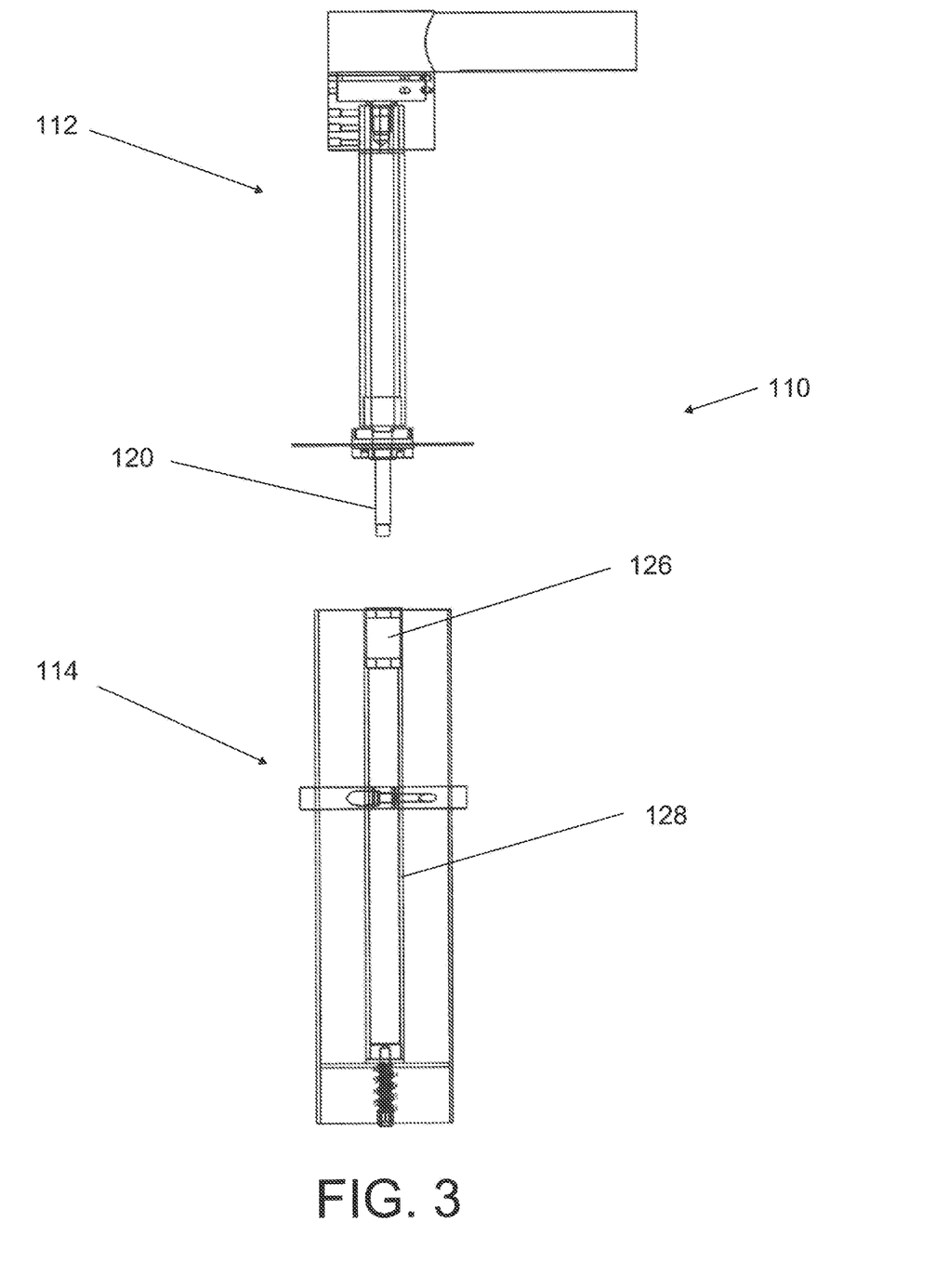
FIG. 3 is a cross-sectional side view of an internal pipe cutter system prior to coupling according to one embodiment of the present disclosure.

FIG. 3 shows an internal pipe cutting system 110 fully assembled, according to one embodiment, prior to a cutting action being completed. The depicted embodiment depicts an uncoupled internal pipe cutting system 110 that includes an internal pipe cutter 112 and a support basket 114.

Figure 4:
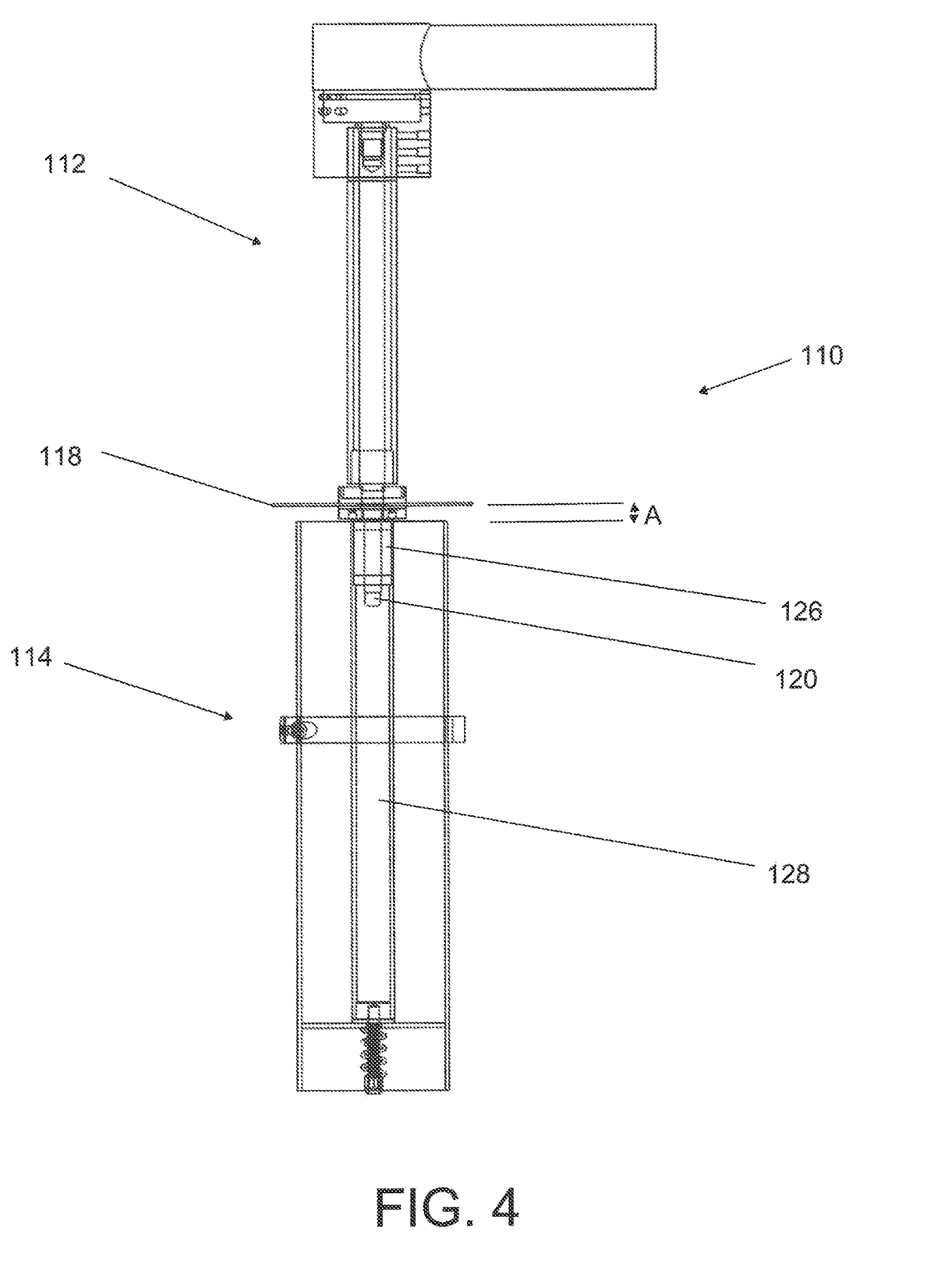
FIG. 4 is a cross-sectional side view of a coupled internal pipe cutter system according to one embodiment of the present disclosure.

FIG. 4 shows an internal pipe cutting system 110 fully assembled, according to one embodiment, ready to complete a cutting action. The depicted embodiment depicts a coupled internal pipe system 110. As shown, the upper shaft 120 is seated within the lower bearing assembly 126, which is secured within the support cylinder 128. This allows the user to both stabilize the internal pipe cutter 112 during a cut and maintain a substantially level cut at a predetermined depth. Once coupled, the bearing assembly 126 can effectively prevent rotation from an upper shaft 120 from be transferred to the support cylinder 128 and support basket 114. As shown, when coupled, the cutting blade 118 floats above the support basket assembly 114 at a distance of A.

Figure 5:
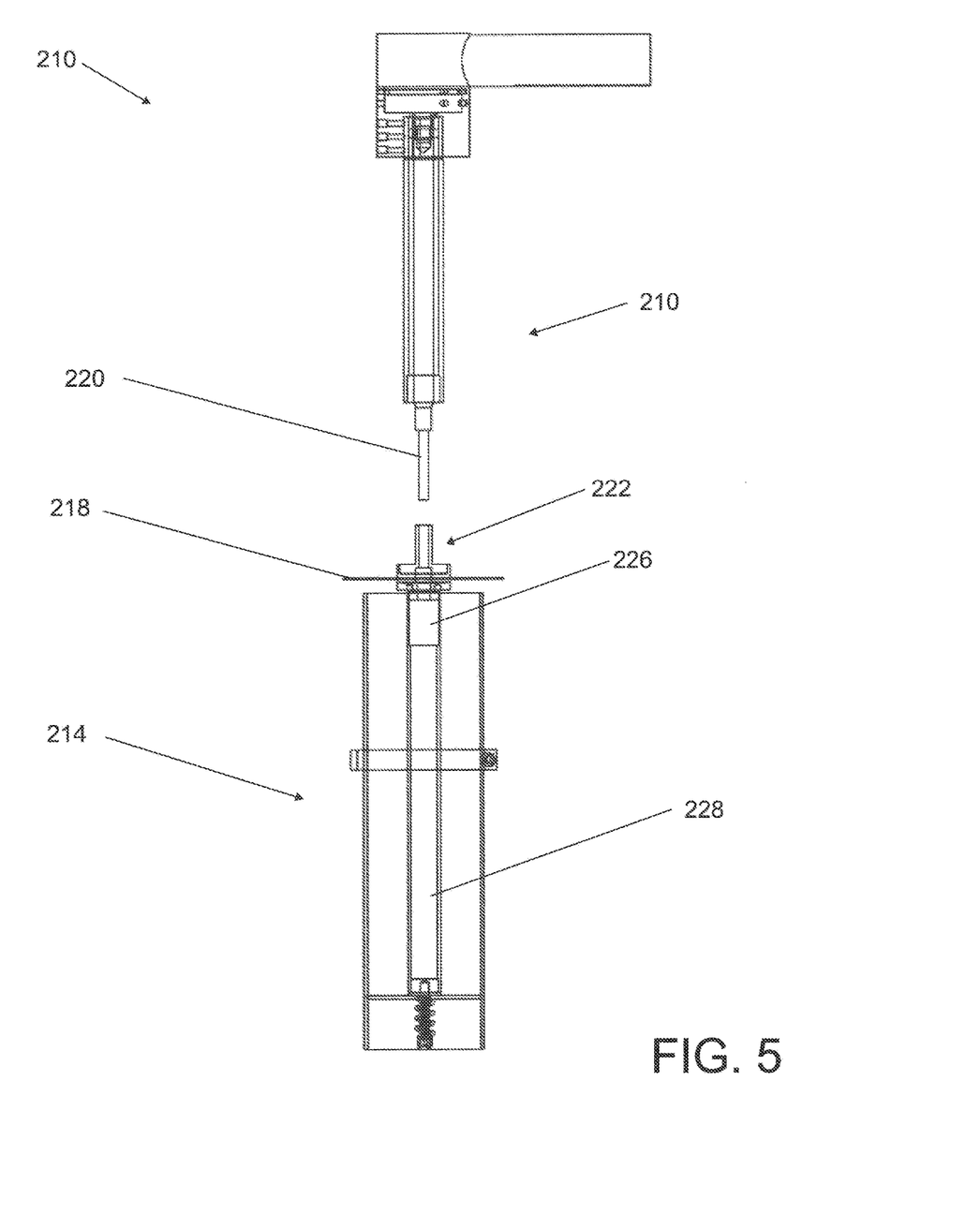
FIG. 5 is a cross-sectional side view of an internal pipe cutter system prior to coupling according to one embodiment of the present disclosure.

FIG. 5 shows an internal pipe cutting system 210 fully assembled, according to one embodiment, prior to a cutting action being completed. The depicted embodiment shows an uncoupled internal pipe cutting system 210 that includes an internal pipe cutter 212 and a support basket 214. In addition, the depicted embodiment can include a cutting blade 218 attached to the support basket 214, specifically attached to the support cylinder 228 and the lower bearing assembly 226. The cutting blade 218 can also be attached to a quick coupling device 222. The quick coupling device 222 can be adapted to accept the upper shaft 220 of the internal pipe cutter 212.

Figure 6:
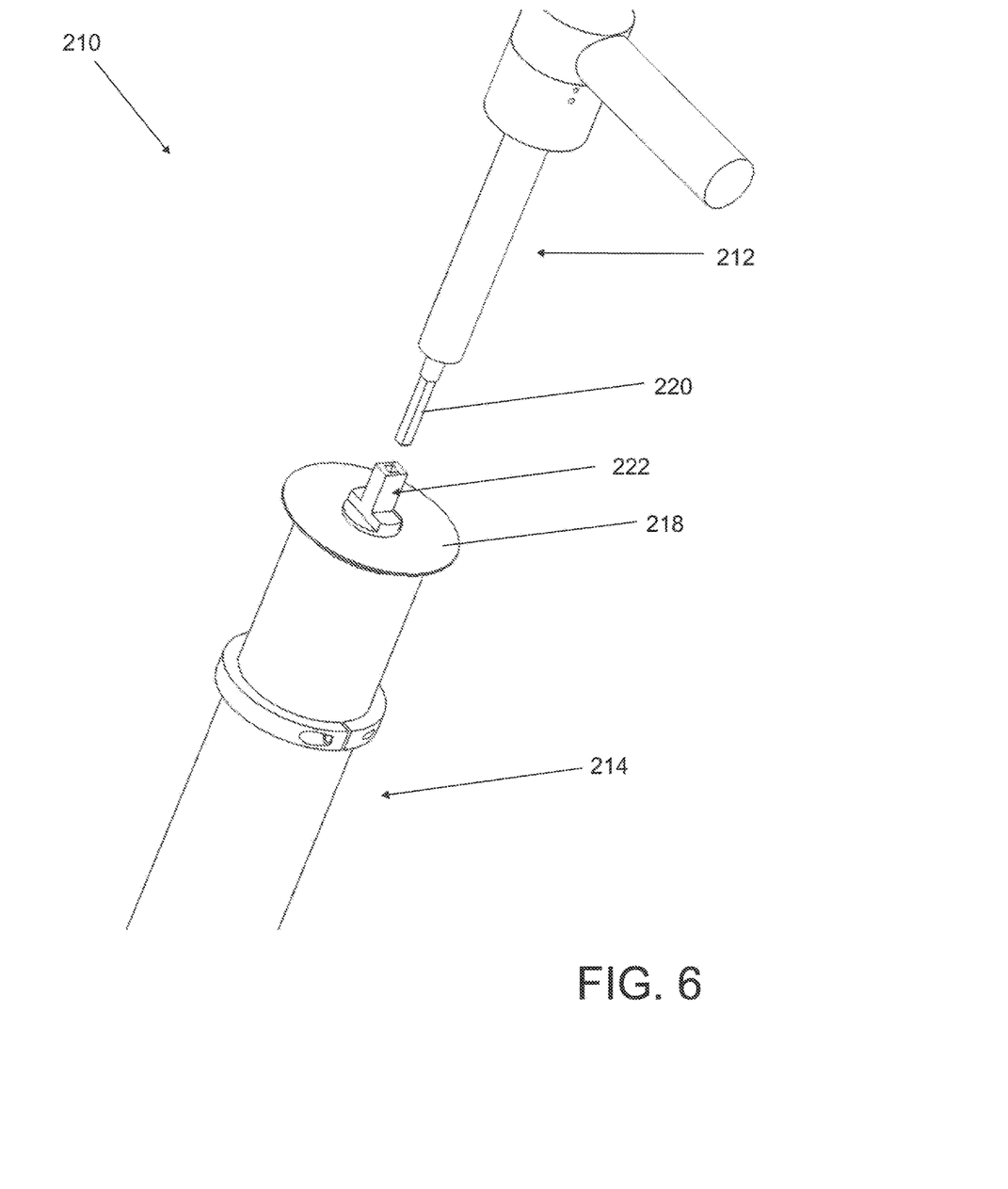
FIG. 6 is an isometric view of the internal pipe cutter system depicted in FIG. 5, prior to coupling according to one embodiment of the present disclosure.

FIG. 6 shows an isometric view of the internal pipe cutting system as depicted in FIG. 5. As shown, the upper shaft 220 can have a square cross-section. The quick coupling device 222 may be sized to accept the square shaped upper shaft 220. In other embodiments, the quick coupling device may be shaped to accept a variety of differently shaped upper shafts.

Figure 7:
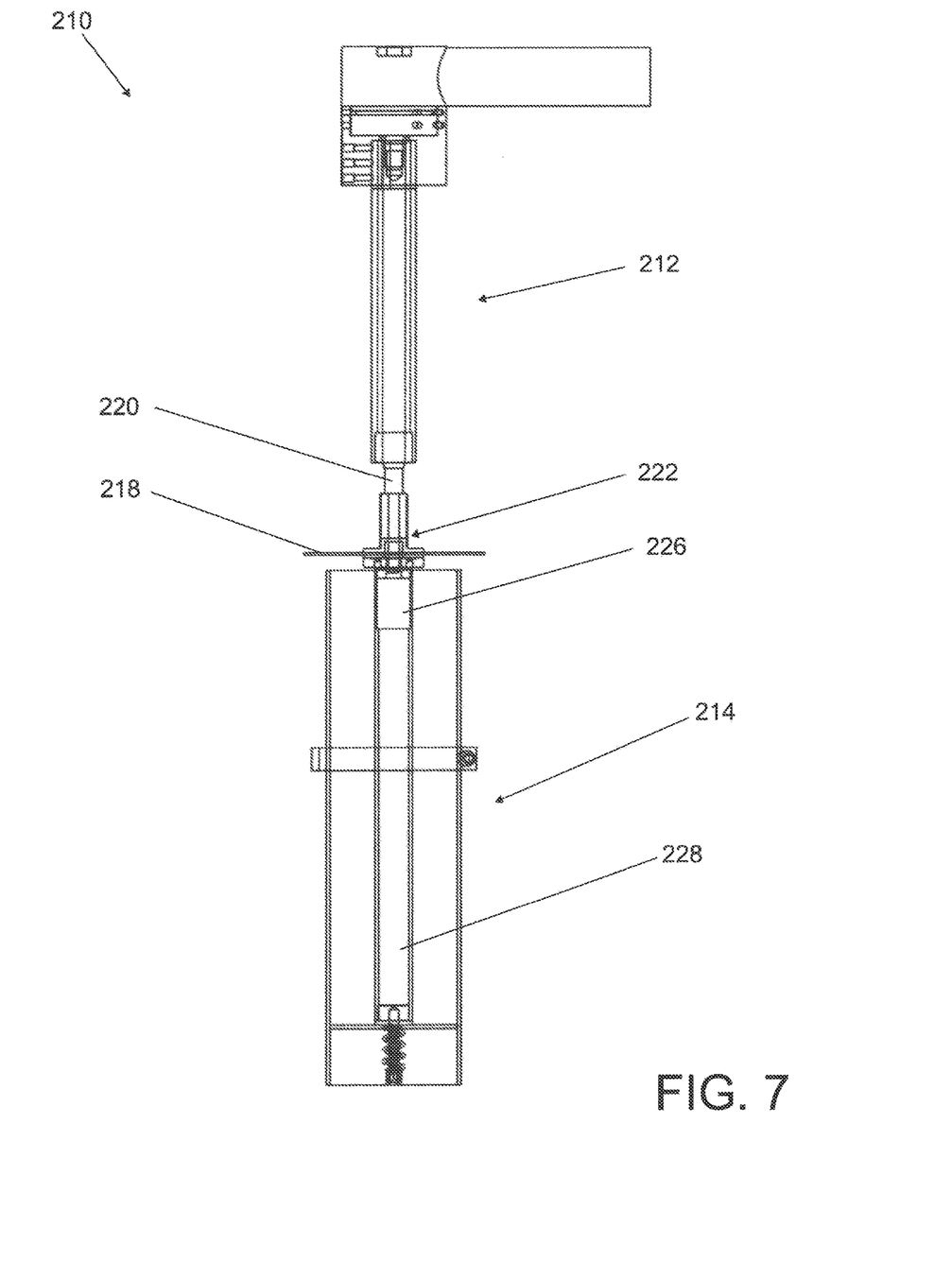
FIG. 7 is a cross-sectional side view of a coupled internal pipe cutter system according to one embodiment of the present disclosure.

FIG. 7 shows an internal pipe cutting system 210 fully assembled, according to one embodiment, ready to complete a cutting action. The depicted embodiment depicts a coupled internal pipe system 210. As shown, the upper shaft 220 is seated within the quick coupling device 222 attached to the cutting blade 218. This allows the user to both stabilize the internal pipe cutter 212 during a cut and maintain a substantially level cut at a predetermined depth. Once coupled, the bearing assembly 226 can effectively prevent rotation from an upper shaft 220 from be transferred to the support cylinder 228 and support basket 214.

Figure 8:
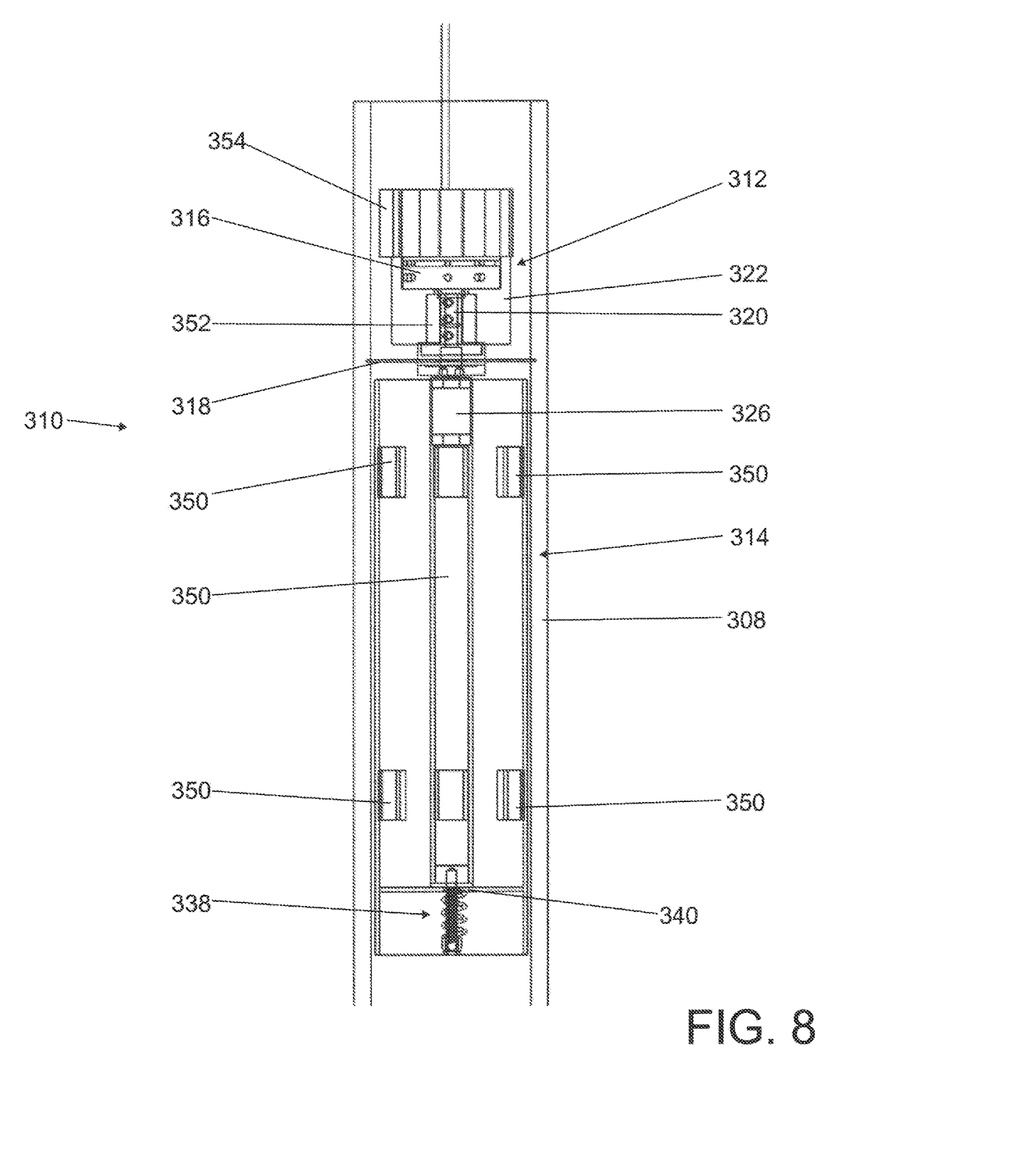
FIG. 8 is a cross-sectional side view of a coupled internal pipe cutter system according to one embodiment of the present disclosure, according to one embodiment of the present disclosure.

FIG. 8 shows a transparent view of an internal pipe cutting system 310 fully assembled, according to one embodiment. The depicted embodiment shows a coupled internal pipe cutting system 310 enabled to travel within a valve box or like pipe 308 (i.e. a pipeline). The internal pipe cutting system 310 can be used to machine, cut and alter the interior pipe surface as it moves within the pipe 308. The depicted embodiment shows an internal pipe cutting system 310 including an internal pipe cutter assembly 312 and support basket assembly 314, according to one embodiment of the present disclosure. The support basket assembly 314 may be configured for placement in the pipe 308 to define the depth and location of the cut and control the cutting of the valve box or pipe. The support basket 314 may include a plurality of positioning wheels 350, a support cylinder 328 and a lower bearing assembly 326. The internal pipe cutter assembly 312 may be coupled to the support basket assembly 314 to perform a cut, or score the interior of the pipe 308, allowing for replacement or modification of the pipe 308.

The internal pipe cutter assembly 312 may include a motor 316, a coupling device 352, a drive shaft 320, a cutting blade 318, a motor mount 322, and counterweight 354.

The internal pipe cutter assembly 312 may include a motor 316 that is either battery powered or tethered to a power source (i.e. electricity or compressed air) near the surface opening of the pipe. In addition, the internal pipe cutter 312 may be remotely operated by a controller at the surface. The controller may control the motor operation, i.e. torque and RPM, to vary the motor's operating characteristics. The motor 316 can also have a drive shaft 320 that is connected to the coupling device 352, which is, in turn, connected to the cutting blade 318.

In some embodiments, the motor 316 can be connected to a motor mount 322 to ensure quick adaptation to the internal pipe cutting system. Additionally, the motor mount 322 can include a counterweight 354 that is enabled to rotate with the motor's drive shaft 320. The counterweight 354 can be a substantially cylindrical in shape and can be axially aligned with the drive shaft 320. The counterweight 354 can include a portion that lies outside the perimeter of the normal cylindrical border that causes unbalanced rotation about the drive shaft axis when the motor 316 is operated.

The internal pipe cutting system 310 may include a support basket assembly 314 coupled to the internal pipe cutter assembly 312. The support basket can include a lower bearing assembly 326, a support cylinder 328, a centering mechanism 138 and a plurality of positioning wheels 350. The lower bearing assembly 326 can be press fit into the support cylinder 328 and attached to the internal pipe cutter assembly 312 by a fastening device. The support cylinder 328 can pivot about a securing point 340 when external forces are applied to the support cylinder 328. Absent forces being applied to the support cylinder 328, the centering mechanism 338 will center the support cylinder 328 and effectively coaxially align the central axis of the support cylinder 328 with the central axis of the support basket 314.

The positioning wheels 350 can be positioned near the periphery of the support basket's exterior surface. The positioning wheels 350 can be positioned so their axes of rotation are parallel to the central axis of the support basket 314. In some embodiments, the positioning wheels' axes of rotation may be skewed to be partially perpendicular, or perpendicular to the support baskets central axis. In some embodiments, the positioning wheels may 350 be spring-loaded. In such an embodiment, a portion of the positioning wheels may extend outside of the perimeter of the support basket 314 when no external force is placed upon them. In such an embodiment, the positioning wheels 350 can then retract within the support basket assembly 314 when an external force is applied. Accordingly, the positioning wheels 350 can exert an outward force against the force causing surface (i.e. a pipe wall). The positioning wheel's outward force can be caused by a spring or like biasing mechanism attached to each positioning wheel. In some embodiments the positioning wheels 350 may have a rubberized outer surface. In other embodiments, the positioning wheels 350 may have plastic or textured metal outer surface. It is envisioned that the positioning wheels 350 may have a variety of different surface textures to enable the wheels to travel within the inside of the pipe; such differing textures are considered within the scope of the present disclosure. In some embodiments, the positioning wheels 350 can also include motors, capable of being controlled remotely, to allow the controller to move the internal pipe cutting system to a desired location within the pipe 308.

Figure 9:
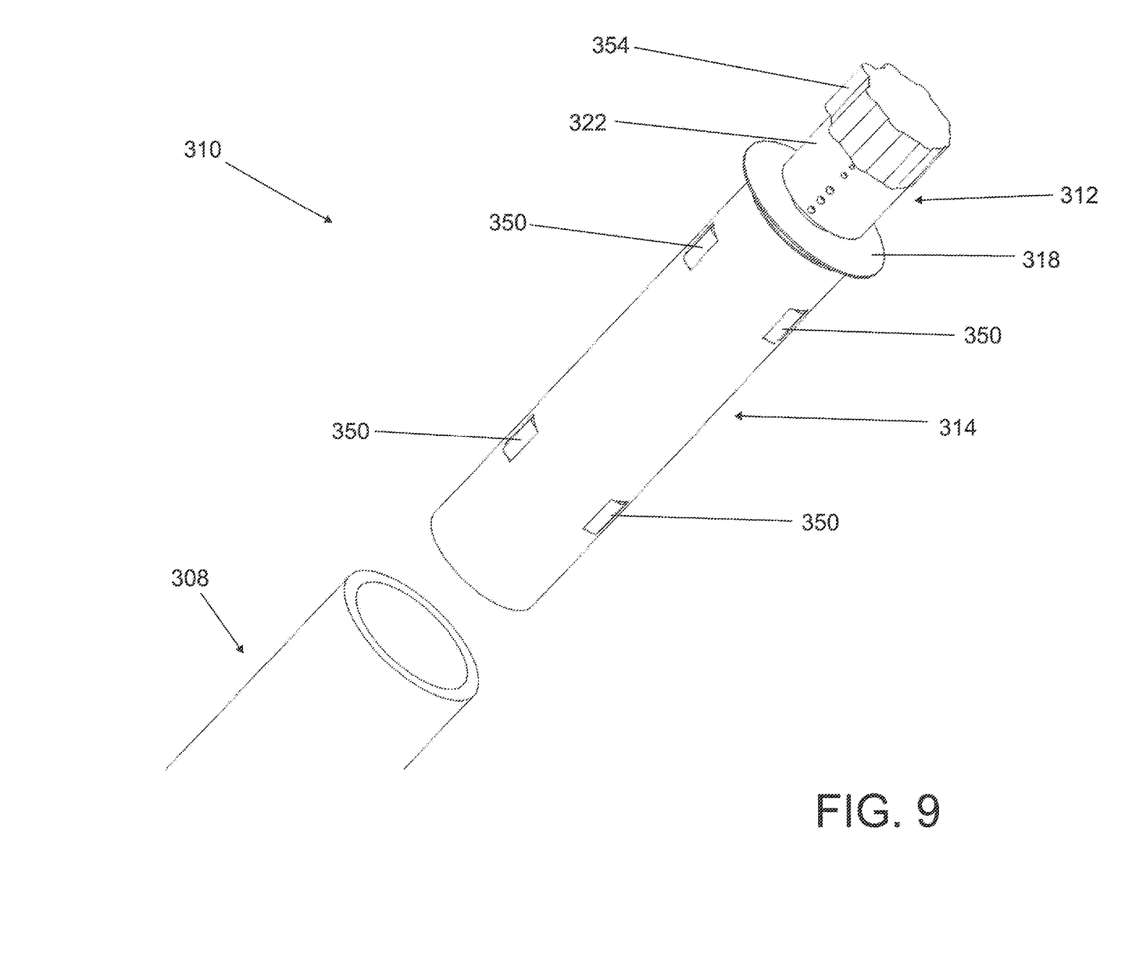
FIG. 9 is an isometric view of the internal pipe cutter system depicted in FIG. 8.

FIG. 9 shows an isometric view of an internal pipe cutting system 310 fully assembled, according to one embodiment. The depicted embodiment depicts a coupled internal pipe system 310, prior to being placed within a pipe. To complete the cutting, or scoring action, the internal pipe cutting system 310 is placed within a pipe and positioned at a desired location. Once positioned, the positioning wheels 350 may provide a braking pressure to the inner walls of the pipe and the motor 316 can be turned on. As the motor is operated, the cutting blade 318, or grinding wheel, makes contact with the pipe wall. The counterweight 354 can provide a wobbling motion in the cutting blade 318 to ensure that the cutting blade 318 makes a complete cut, or grind of the entire pipe. The lower bearing assembly 326, support cylinder 328 and centering mechanism 338 ensure freedom of movement for the cutting blade.

FIG. 10 shows a cut away view of support basket assembly 414, according to one embodiment, within a broken water valve box 400. As shown, the support basket assembly 414 can be lowered into a valve box assembly 400. The valve box assembly 400 consists of a lower valve box 402 and upper valve box 404. After lowering the support basket assembly 414 into the valve box 400, the adjustable ring of the support basket assembly 430 becomes seated on the upper lip of the lower valve box 402. The adjustable ring 430 may be positioned on the exterior of the support basket 414 to alter the depth of the support basket 414 within the valve box 400. For example, the adjustable ring 430 may be positioned towards the proximal end of the support basket 414 to cause the support basket 414 to sit deeper within the valve box 400. Alternatively, the adjustable ring 430 may be positioned towards the distal end of the support basket 414 to cause the support basket 414 to sit at a more shallow depth within the value box 400. When seated upon the upper lip of the lower valve box 402, the support basket 414 is properly positioned below the damaged upper valve box section 410 of the upper valve box 402.

Figure 11:
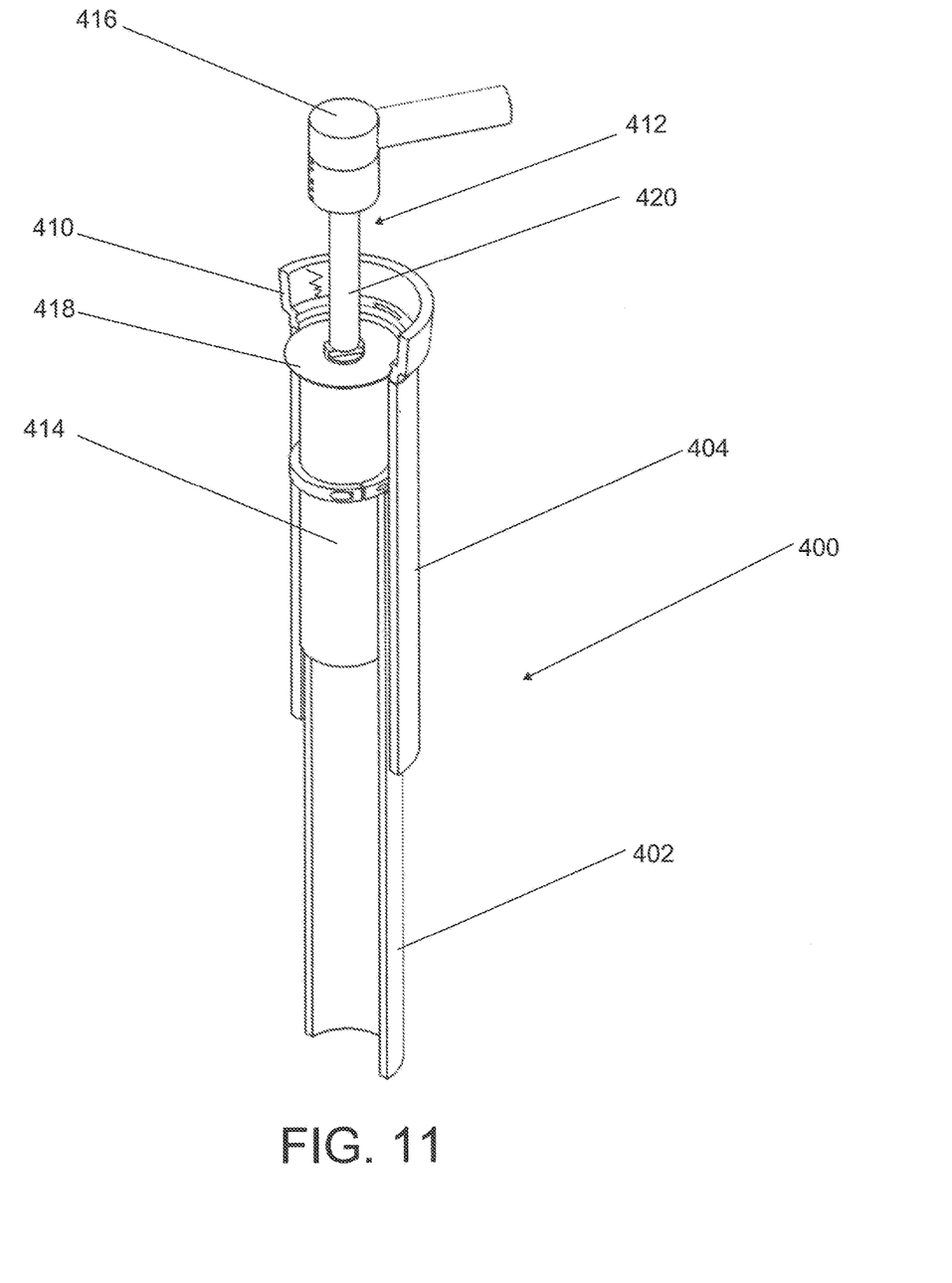
FIG. 11 is an isometric partial cross-sectional view of a valve box assembly including an internal pipe cutting system, according to one embodiment of the present disclosure, located therein.

As shown in FIG. 11, the internal pipe cutter assembly 412 can be inserted into the valve box assembly 400 after the support basket assembly 414. The internal pipe cutter assembly 412 should be inserted until the internal pipe cutter assembly 412 is rested upon a support element of the support basket 414. According to one embodiment, the internal pipe cutter 412 is lowered until the upper shaft of the internal pipe cutter seats within the lower bearing assembly of the support cylinder, which is attached to the support basket 414 (see FIG. 4). The motor 416 of the internal pipe cutter assembly 412 can then be powered on. Upon operation of the motor 416, the upper shaft 420 can deliver torsional energy from the motor 416 to the cutting blade 418. To complete a cut through the upper valve box 404 the internal pipe cutter assembly's upper shaft 440 can be axially manipulated to orbit the valve box assembly's longitudinal axis until the damaged upper valve box 410 has been severed from the remaining upper valve box 404 by the cutting blade 318. Once the cut is complete the internal pipe cutter 412 and support basket 414 can be removed.

Figure 12:
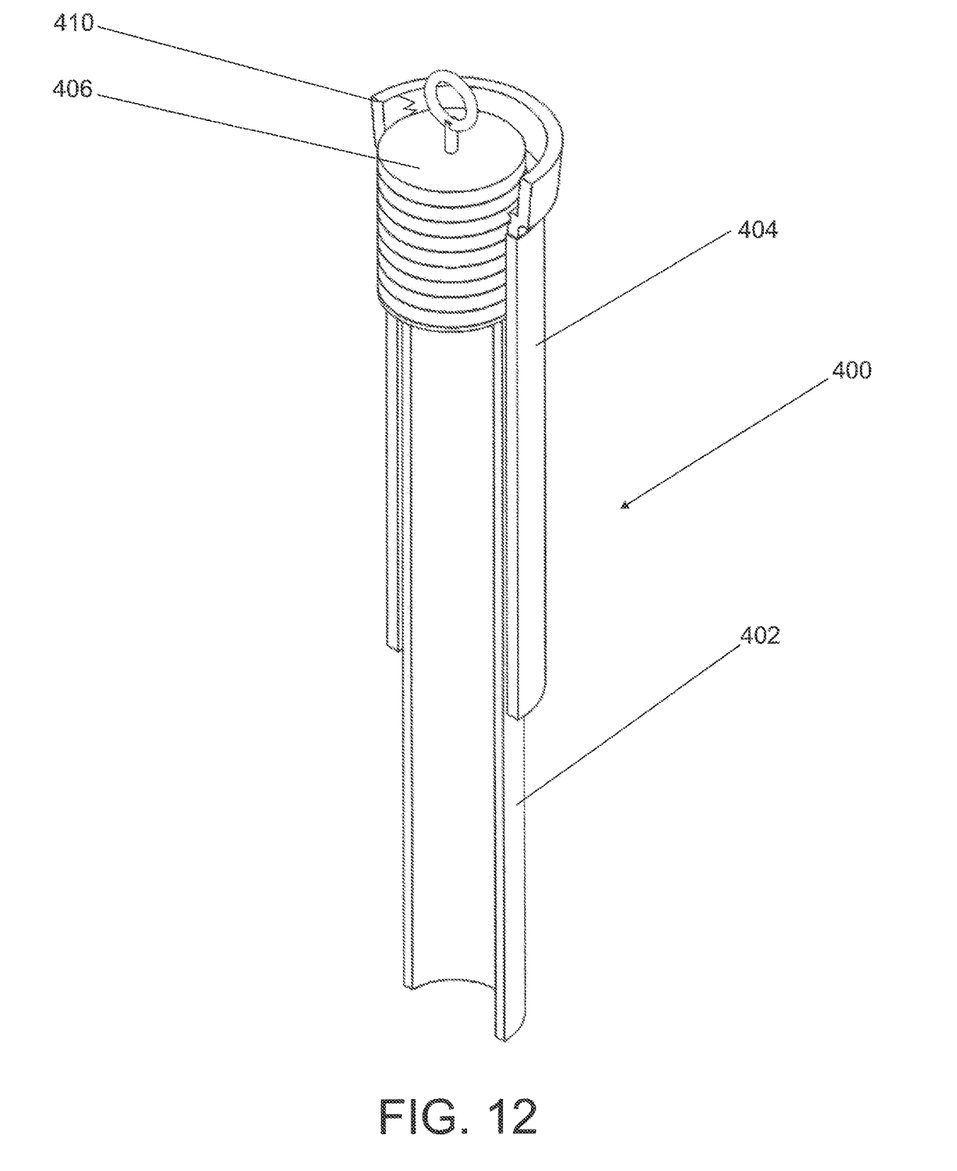
FIG. 12 is an isometric partial cross-sectional view of a valve box assembly including a puller, according to one embodiment of the present disclosure, threaded into a damaged upper valve box.

FIG. 12 shows a puller 406 being threaded into the damaged upper valve box 410 after the internal pipe cutter has been removed. The puller 406 can utilize friction to the grip the damaged upper valve box 410 for effortless removal. In some embodiments, the puller 406 can be threaded, the threads adapted to press fit against the wall of the damaged upper valve box 410. In some embodiments, the puller 406 is manufactured from plastic. In other embodiments, the puller 406 is manufactured from metal (i.e. aluminum or steel). Once the puller 406 has been inserted into the damaged upper valve box 410, utilizing mechanical leverage, the puller 406 and damaged upper valve box 410 can be removed vertically from the remaining upper valve box 404.

Figure 13:
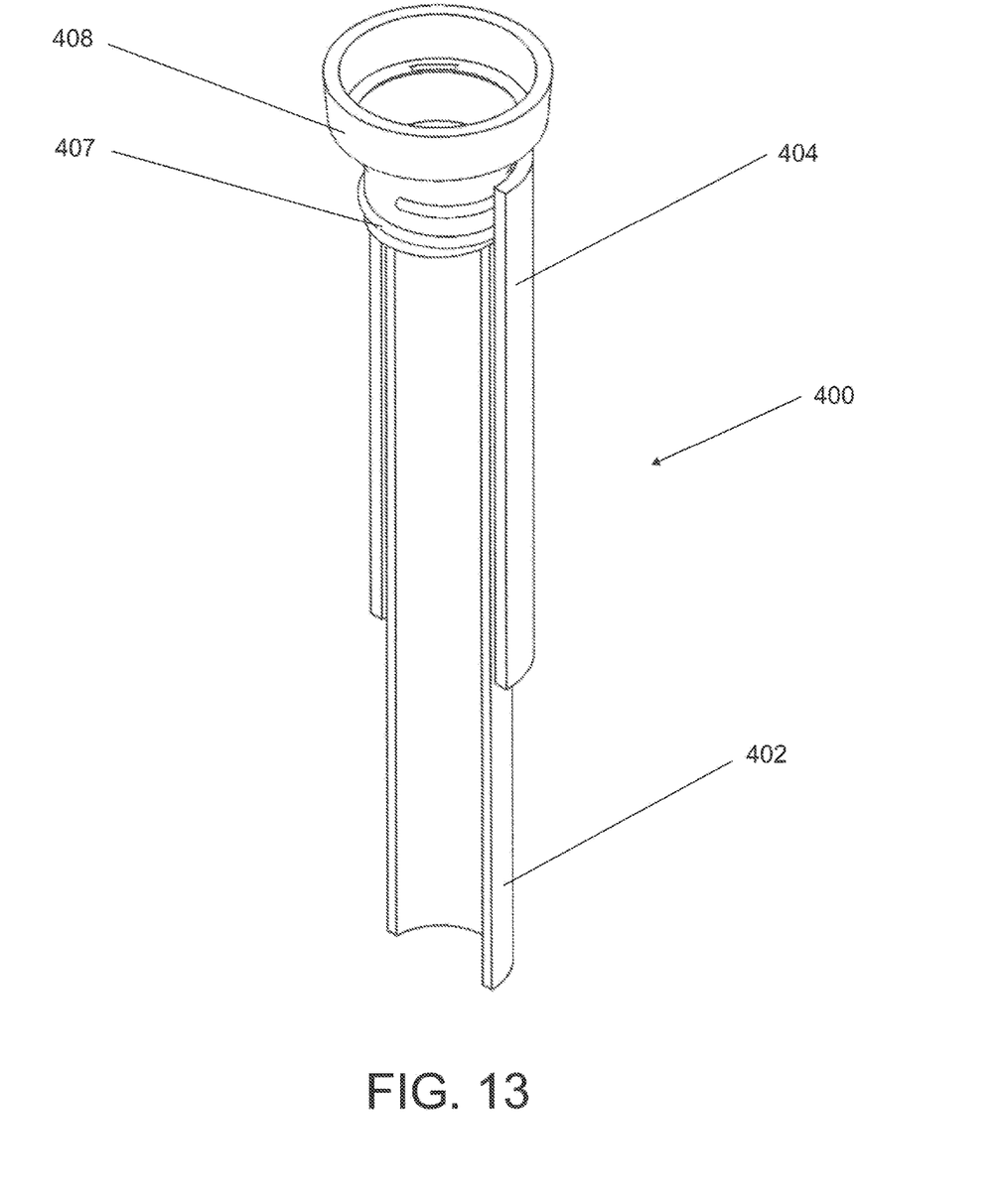
FIG. 13 is an isometric partial cross-sectional view of a valve box assembly including a replacement upper valve box threaded into a remaining upper valve box and seated on a lip of a lower valve box.

As shown in FIG. 13, a replacement upper valve box 408 can be threaded, in one embodiment, into the remaining upper valve box 404 until the upper lip of the replacement upper valve box 408 is set slightly below the height of the road surface. The threads of the replacement upper valve box 407 can be manufactured to align with preexisting threads within the valve box 400. In another embodiment, the threads of the replacement upper valve box 407 can be manufactured so they provide a press fit within the upper valve box 404 to ensure that the replacement upper valve box 408 is secure.

Additional Notes and Examples

In Example 1, an internal pipe cutting system can include an internal pipe cutter, the internal pipe cutter including a motor, an upper shaft having a proximal end and a distal end, the proximal end configured to connect to the motor, and a rotary cutting blade removably coupled to the distal end of the upper shaft; a hollow cylindrical support basket having an interior surface and an exterior surface, the support basket including an adjustable ring removably mounted to the exterior surface of the support basket; and a bearing assembly configured to be coupled between the internal pipe cutter and the support basket.

In Example 2, the support basket of Example 1 further includes a stabilizing element, the stabilizing element being configured to interact with the upper shaft of the internal pipe cutter.

In Example 3, the stabilizing element of Example 2 is a support cylinder secured within the support basket.

In Example 4, the support cylinder of Example 3 includes a centering mechanism configured to coaxially align the central axis of the support cylinder and the central axis of the support basket in the absence of external forces applied to the support cylinder.

In Example 5, the bearing assembly of Example 1 is secured to the support basket.

In Example 6, the bearing assembly of Example 1 is secured to the upper shaft of the internal pipe cutter.

In Example 7, the bearing assembly of Example 1 is secured to both the upper shaft of the internal pipe cutter and the support basket.

In Example 8, the internal pipe cutter of Example 1 further includes a motor mount coupled to the motor, the motor mount having a proximal end and a distal end, and an upper shaft housing encasing the upper shaft, the upper shaft housing being attached to the distal end of the motor mount.

In Example 9, an internal pipe cutter can include a motor; a motor mount coupled to the motor, the motor mount having a proximal end and a distal end; an upper shaft having a proximal end and a distal end, the proximal end configured to connect to the motor; a rotary cutting blade removably coupled to the distal end of the upper shaft; and an upper shaft housing coupled to the distal end of the motor mount, the upper shaft housing being sized to encase the upper shaft from the distal end of the motor mount to the rotary cutting blade.

In Example 10, the internal pipe cutter of Example 9 further includes a lower bearing assembly secured to the distal end of the upper shaft.

In Example 11, the internal pipe cutter of Example 10 further includes a support cylinder secured to the lower bearing assembly, the support cylinder having a proximal and distal end, the distal end being configured to rest steadily upon a resting surface.

In Example 12, the internal pipe cutter of Example 9 further includes an upper bearing assembly rotatably secured to the upper shaft housing and the upper shaft.

In Example 13, an internal pipe cutter support basket can include an interior surface and an exterior surface; an adjustable ring removably mounted to the exterior surface; and an internal stability element mounted to the interior surface, wherein the central axis of the internal stability element coaxially aligns with the central axis of the support basket.

In Example 14, the internal stability element of Example 13 is a support cylinder, the support cylinder having a central axis being coaxially aligned with the central axis of the support basket.

In Example 15, the internal pipe cutter support basket of Example 14 further includes a bearing assembly secured within the internal stability cylinder, the bearing assembly being configured to accept an external rotating shaft.

In Example 16, the internal pipe cutter support basket of Example 13 further includes a centering mechanism attached to the internal stability element and the support basket, wherein the centering mechanism centers the internal stability element within the support basket in the absence of external forces applied to the stability surface.

The preceding description has been presented only to illustrate and describe various examples or illustrations of the embodiments. It is not intended to be exhaustive or limit to any precise form disclosed. Many modifications and variations are possible in light of the above teaching. Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Thus, particular embodiments of the subject matter have been described. Other embodiments are within the scope of the following claims.

We claim:

1. A method of repairing a damaged water valve box, the method comprising:
    determining the lowest point in an upper valve box where damage has occurred;
    centering an internal pipe cutter assembly within a pipe utilizing a centering mechanism coupled to a support cylinder;
    cutting, with a cutting blade, the upper valve box below the lowest point of damage utilizing the internal pipe cutter assembly by applying an external force to pivot, from a pivot point, the support cylinder out of coaxial alignment with a support basket;
    extracting a damaged upper valve box; and
    inserting a replacement upper valve box into a remaining upper valve box.

2. The method of claim 1, wherein the damaged upper valve box is extracted by a method comprising:
    threading a puller onto the damaged upper valve box;
    attaching the puller to a device providing mechanical advantage; and
    extracting the damaged upper valve box by exerting a force on the device providing mechanical advantage which translates force down onto the puller attached to the damaged upper valve box.

3. The method of claim 1, wherein extracting a damaged upper valve box includes using a puller coupled to the upper valve box.

4. The method of claim 1, wherein determining the lowest point in the upper valve box where damage has occurred includes utilizing an adjustable ring that defines a depth and a location of a cut.

5. The method of claim 4, wherein determining the lowest point in the upper valve box to be cut involves measuring the size of the upper valve box.

6. The method of claim 1, wherein applying an external force includes using a motor coupled to the support cylinder.

7. The method of claim 1, wherein the external force places the cutting blade of the internal pipe cutter assembly in engagement with the pipe wall.

8. The method of claim 1, wherein centering the assembly within the pipe includes utilizing at least one spring coupled to the pivot point.

9. The method of claim 1, wherein utilizing the internal pipe cutter assembly to cut the pipe is performed with remote control.

10. The method of claim 1 further comprising utilizing positioning wheels to maintain a position of the internal pipe cutter assembly within the pipe.

11. The method of claim 10 wherein the positioning wheels maintain position using an outer surface formed from a material including at least one of rubber, plastic, and textured metal.

12. The method of claim 1, wherein the cutting blade is a disc.

13. The method of claim 1, wherein the cutting blade includes at least one material selected from the group consisting of metal, aluminum oxide, ceramic, abrasives, fiberglass, diamond, or concrete cutting material.

* * * * *